(12) United States Patent
Iwasaki

(10) Patent No.: US 6,643,244 B1
(45) Date of Patent: Nov. 4, 2003

(54) LIQUID-CRYSTAL PANEL, OPTICAL PICKUP, AND INFORMATION REPRODUCING SYSTEM

(75) Inventor: Masayuki Iwasaki, Tsurugashima (JP)

(73) Assignee: Pioneer Electronic Corporation, Tokyo (JP)

(*) Notice: Subject to any disclaimer, the term of this patent is extended or adjusted under 35 U.S.C. 154(b) by 0 days.

(21) Appl. No.: 09/351,916

(22) Filed: Jul. 14, 1999

(30) Foreign Application Priority Data

Jul. 15, 1998 (JP) .......................... 10-200479

(51) Int. Cl.$^7$ ................................ G11B 7/00

(52) U.S. Cl. ................. 369/112.01; 369/44.28

(58) Field of Search .......................... 369/44.28, 44.32, 369/53.1, 53.12, 53.19, 112.01, 112.02

(56) References Cited

U.S. PATENT DOCUMENTS 5,734,637 A    3/1998  Ootaki et al. ............. 369/112
6,078,554 A *  6/2000  Ootaki et al. ............. 369/44.32

FOREIGN PATENT DOCUMENTS

JP      10-20263        1/1998

* cited by examiner

Primary Examiner—Muhammad Edun
(74) Attorney, Agent, or Firm—Morgan, Lewis & Bockius LLP

(57) ABSTRACT

A liquid-crystal panel is placed in an optical path of an optical beam from a light source to a recording surface of a recording medium for compensating wavefront aberration of the optical beam by giving a phase difference to the optical beam. The liquid-crystal panel comprises a layer of a liquid crystal material having an index of birefringence, wherein the product of the index of birefringence and thickness of the layer of the liquid crystal material is 0.4 $\mu$m or more.

7 Claims, 12 Drawing Sheets

LIQUID-CRYSTAL PANEL, OPTICAL PICKUP, AND INFORMATION REPRODUCING SYSTEM

This Application claims the benefit of Japanese Application No. 10-200479 filed on Jul. 15, 1998, which is hereby incorporated by reference.

BACKGROUND OF THE INVENTION

1. Field of the Invention

The present invention relates to a liquid-crystal panel for optically compensating wavefront aberration, and more particularly, to a liquid-crystal panel for optically compensating wavefront aberration produced due to a tilt of an optical axis of an optical beam relative to a recording surface of a recording medium. The present invention also relates to an optical pickup and a reproducing system equipped with a liquid-crystal panel.

2. Description of the Related Art

A generally known liquid-crystal panel has electrodes on both surfaces of a layer of a liquid crystal material for compensating wavefront aberration produced due to a tilt of an optical axis. The orientation of the liquid crystal molecules varies depending on the applied voltage. Using this characteristic, the liquid-crystal panel compensates wavefront aberration by changing the index of refraction of the liquid crystal material for the optical beam transmitted through this liquid crystal material. In fact, different voltages are applied to different portions of the liquid-crystal panel, and thus the liquid-crystal panel has various refractive indices at the different portions for the optical beam. As a result, the optical path length and phases of the optical beam are different at individual portions of the liquid-crystal panel. This varies the optical path length to the information-recording surface, thus canceling the effects of a tilt of an optical axis.

In the liquid-crystal panel described above, as the applied voltage is varied, the phase difference that can be imparted to the transmitted light beam varies. Depending on the characteristics of the liquid-crystal panel, the phase difference may vary non linearly in response to variations in the voltage. As a result, it is necessary to vary the applied voltage in a complex manner to control the imparted phase difference. The control system for the liquid-crystal panel is, therefore, complex.

Furthermore, depending on the characteristics of the liquid-crystal panel, the amount of wavefront aberration may exceed the range of phase difference applied by voltage to the light beam. Thus, it may be impossible to sufficiently compensate for the generated wavefront aberration.

SUMMARY OF THE INVENTION

Accordingly, the present invention is directed to a liquid-crystal panel, optical pickup and information reproducing system that substantially obviates one or more of the problems due to limitations and disadvantages of the related art.

An object of the present invention is to provide a liquid-crystal panel that is capable of applying the necessary and sufficient phase difference to an optical beam by a simple voltage control method.

Another object of the invention is to provide an optical pickup equipped with the liquid-crystal panel described above.

A further object of the invention is to provide an information reproducing system equipped with the liquid-crystal panel described above.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention includes a liquid-crystal panel placed in an optical path of an optical beam from a light source to a recording surface of a recording medium, for compensating wavefront aberration of the optical beam by giving a phase difference to the optical beam, the liquid-crystal panel comprising a layer of a liquid crystal material having an index of birefringence, wherein a product of the index of birefringence and thickness of the layer of the liquid crystal material is 0.4 μm or more.

In another aspect, the present invention includes a liquid-crystal panel placed in an optical path of an optical beam from a light source to a recording surface of a recording medium, for compensating wavefront aberration of the optical beam by giving a phase difference to the optical beam, the liquid-crystal panel comprising a layer of a liquid crystal material having an index of birefringence, wherein a product of the index of birefringence and a thickness of the layer of the liquid crystal material is set to at least an amount of wavefront aberration to be compensated.

In a further aspect, the present invention includes a liquid-crystal panel placed in an optical path of an optical beam from a light source to a recording surface of a recording medium, for compensating wavefront aberration of the optical beam by giving a phase difference to the optical beam in accordance with an applied voltage, the liquid-crystal panel comprising a layer of a liquid crystal material having an index of birefringence, wherein a product of the index of birefringence and a thickness of the layer of the liquid crystal material is set so that the phase difference varies substantially linearly with variations in the applied voltage within a range of the phase difference corresponding to an amount of wavefront aberration to be compensated.

In another aspect, the present invention includes an optical pickup comprising a light source for emitting an optical beam; a liquid-crystal panel placed in an optical path of the optical beam from the light source to a recording surface of a recording medium, for compensating wavefront aberration of the optical beam by giving a phase difference to the optical beam in accordance with an applied voltage, the liquid-crystal panel including a layer of a liquid crystal material having an index of birefringence, a product of the index of birefringence and thickness of the layer of the liquid crystal material being 0.4 μm or more; an objective lens for focusing the optical beam transmitted through the liquid-crystal panel onto the recording medium; and a light-receiving means for receiving the optical beam reflected from the recording medium and for producing an output signal representing the received beam.

An information reproducing system comprising a light source for emitting an optical beam; a liquid-crystal panel placed in an optical path of the optical beam from the light source to a recording surface of a recording medium, for compensating wavefront aberration of the optical beam by giving a phase difference to the optical beam, the liquid-crystal panel including a layer of a liquid crystal material having an index of birefringence, a product of the index of birefringence and the layer of the liquid crystal material being 0.4 μm or more; a voltage application means for applying a voltage across the liquid-crystal panel to give the phase difference to the optical beam; an objective lens for focusing the optical beam transmitted through the liquid-crystal panel onto the recording medium; a light-receiving means for receiving the optical beam reflected from the recording medium and for producing an output signal representing the received beam; and a reproducing means for reproducing information from the output signal from the light-receiving means.

It is to be understood that both the foregoing general description and the following detailed description are exemplary and explanatory only are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles on of the invention. In the drawings.

DESCRIPTION OF THE PREFERRED EMBODIMENT

Reference will now be made in detail to the preferred embodiment of the present invention, an example of which is illustrated in the accompanying drawings. Wherever possible, the same reference numbers will be used throughout the drawings to refer to the same or like parts.

As embodied herein, the present invention relates to an information reproducing system for reproducing information from a recording medium consisting of a digital video (or versatile) disk (DVD) having a storage capacity about seven times as large as that of the conventional compact disk (CD). When information is read from the DVD, wavefront aberration is produced due to variations in the angle between the DVD and the optical axis of the optical beam. Such variations occur because of a warp of the DVD, external vibrations, or vibration of the DVD induced by rotation.

In the following embodiment, only one of the wavefront aberrations produced in the radial direction of the DVD and wavefront aberration produced in the tangential direction is compensated. First, the whole structure of the information reproducing system in accordance with the invention is described by referring to FIG. 1.

Figure 1:
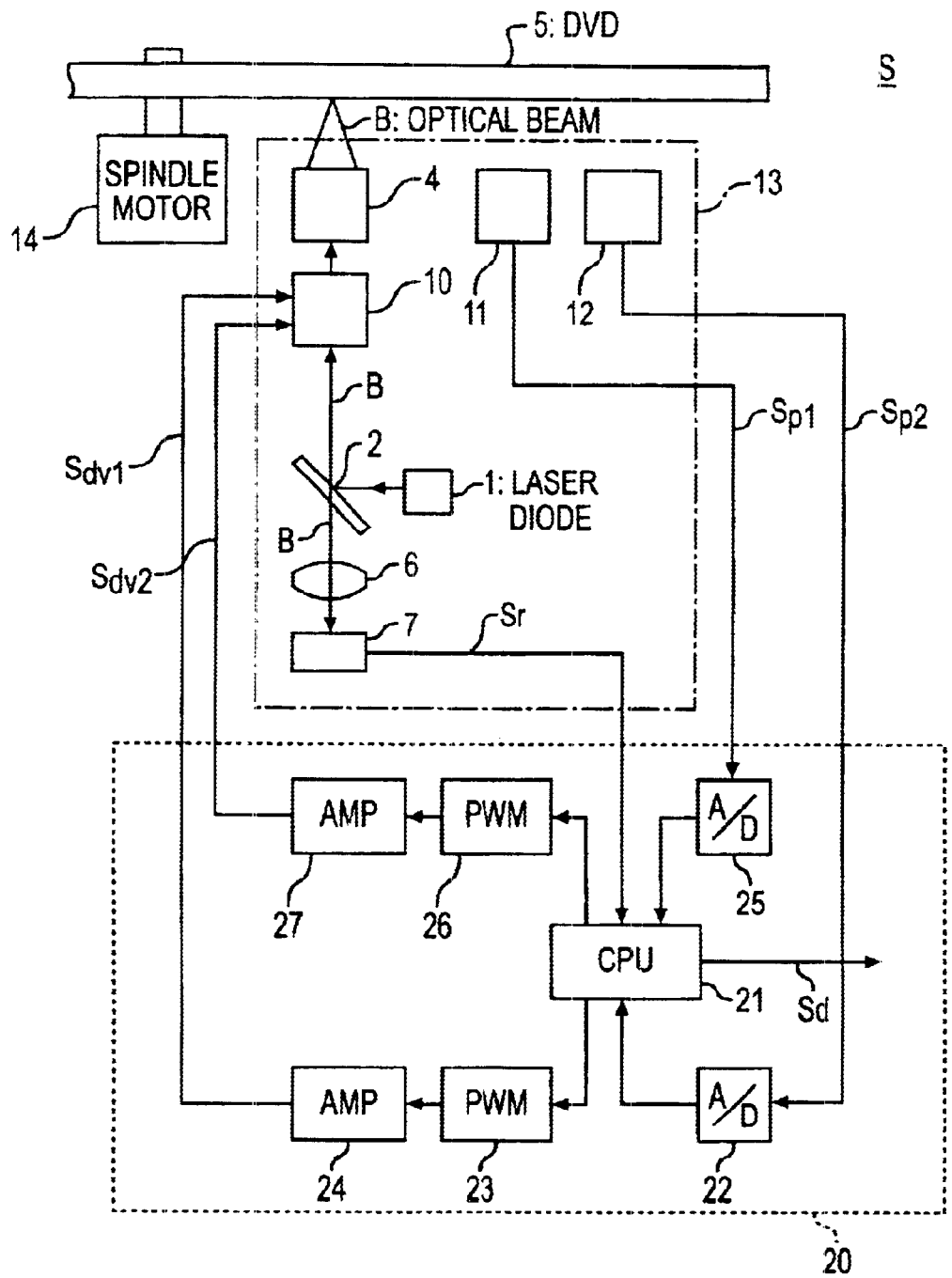
FIG. 1 is a schematic block diagram of an information reproducing system in accordance with an embodiment of the present invention.

As shown in FIG. 1, the information reproducing system S comprises a spindle motor 14 it for rotating a DVD 5 at a given rotational speed, an optical pickup 13 incorporating a liquid-crystal panel (described later), and a reproduction control portion 20. The optical pickup 13 directs an optical beam B to the DVD 5 while compensating for produced wavefront aberration. The pickup 13 receives reflected light from the DVD 5, and based on the reflected light, produces an output signal Sr representing information recorded on the DVD 5. The reproduction control portion 20 drives the liquid-crystal panel of the pickup 13 to compensate for the wavefront aberration. The reproduction control portion 20 also acts to retrieve the recorded information from the output signal Sr from the pickup 13 and to produce a reproduction signal Sd.

The optical pickup 13 comprises a laser diode 1 as a light source, a half mirror 2, an objective lens 4, a condensing lens 6, and a photo detector 7 acting as a light-receiving means. Moreover, the optical pickup 13 comprises a liquid-crystal panel 10 in accordance with the present invention, a radial direction tilt sensor 11, and a tangential direction tilt sensor 12. The radial direction tilt sensor 11 detects the tilt angle of an area of the DVD 5 illuminated with the optical beam B in the radial direction. The tangential direction tilt sensor 12 detects the tilt angle of the area in the tangential direction.

The reproduction control portion 20 comprises a CPU 21, A/D converters 22 and 25, pulse width modulation (PWM) circuits 23 and 26 acting as voltage application means, and amplifiers 24 and 27. The operation of the whole apparatus is next described.

The DVD 5 is rotationally driven at a given rotational frequency by the spindle motor 14. The laser diode 1 emits the optical beam B, which is partially reflected by the half mirror 2 and enters the liquid-crystal panel 10. When the beam passes through the liquid-crystal panel 10, the wavefront aberration is compensated. Then, the beam is focused onto the recording surface of the DVD 5 by the objective lens 4.

The optical beam B reflected from the recording surface of the DVD 5 again passes through the objective lens 4 and through the liquid-crystal panel 10. Then, the beam passes through the half mirror 2 and is focused onto the photo detector 7 via the condensing lens 6. The reflected light of the optical beam B received by the photo detector 7 is converted into the electric signal Sr by the photo detector 7 and supplied to the CPU 21. The CPU 21 then demodulates the signal by a given method and produces the reproduction signal Sd representing the information recorded on the DVD 5 to a reproducing circuit (not shown).

Simultaneously with the operation described above, the tilt angle of the DVD 5 in the radial direction is detected by the radial direction tilt sensor 11. The sensor 11 produces an analog tilt detection signal Sp1 and supplies it to the A/D converter 25. The AID converter converts the tilt detection signal Sp1 into a digital signal and supplies it to the CPU 21.

Similarly, the tilt angle of the DVD 5 in the tangential direction is detected by the tangential direction tilt sensor 12, which produces an analog tilt detection signal Sp2. The tilt detection signal Sp2 is converted into a digital signal by the A/D converter 22 and supplied to the CPU 21.

The radial direction tilt sensor 11 and the tangential direction tilt sensor 12 are photo sensors of the same structure. Each sensor has one light-emitting portion and two light-receiving portions. The radial direction tilt sensor 11 is so positioned as to detect the tilt angle of the DVD 5 in the radial direction. Similarly, the tangential direction tilt sensor 12 is so positioned as to detect the tilt angle in the tangential direction.

The CPU 21 then creates a driving signal Sdv1 based on the incoming tilt detection signal indicative of the tilt angle in the radial direction. The driving signal is pulse width-modulated by the PWM circuit 23 and amplified by the amplifier 24. The driving signal Sdv1 outputted from the amplifier 24 is fed to patterned electrodes (described later) of the liquid-crystal panel 10.

At the same time, the CPU 21 creates a driving signal Sdv2 based on the input signal Sp2 representative of the tilt angle in the tangential direction. The driving signal is pulse width-modulated by the PWM circuit 26 and amplified by the amplifier 27. The driving signal Sdv2 outputted from the amplifier 27 is supplied to the patterned electrodes of the liquid-crystal panel 10. The operation of the CPU 21 is next described in detail.

The CPU 21 calculates an amount of compensation for the aberration in the radial or tangential direction based on the tilt detection signals Sp1 and Sp2 from the A/D converters 22 and 25, respectively. The amount of compensation is a phase difference to be applied to the optical beam B passing through the liquid-crystal panel 10 in order to cancel the wavefront aberration produced due to the tilt angle in the radial and tangential directions. In this case, the CPU 21 calculates the amount of compensation for aberration according to the values of the tilt detection signals Sp1 and Sp2 and using the compensation amount data stored in advance in a ROM (read-only memory, not shown). The compensation amount data indicates an amount of compensation corresponding to the tilt angle in each of the radial and tangential directions. The driving signals Sdv1 and Sdv2 indicating the amount of compensation are supplied to the PWM circuits 23 and 26 respectively.

Then, the PWM circuits 23 and 26 pulse width-modulate the driving signals Sdv1 and Sdv2. The output signals from the PWM circuits 23 and 26 are amplified to predetermined levels by the amplifiers 24 and 27 respectively, and then fed to the corresponding patterned electrodes of the liquid-crystal panel 10.

The index of refraction of the liquid-crystal panel 10 is controlled according to the driving signal Sdv1 and Sdv2 supplied to the-patterned electrodes. Thus, a phase difference is introduced in the optical beam B transmitted through the liquid-crystal panel 10, and the wavefront aberration in the radial and tangential direction is compensated.

The structure and the operation of the liquid-crystal panel 10 in accordance with the present invention are next described by referring to FIGS. 2A–9B. As shown in the vertical cross section of FIGS. 2A–2C, orientation films 10e and 10f are formed on both sides of a layer of a liquid crystal material 10g containing liquid crystal molecules M to orient the molecules in a desired manner. Transparent electrodes 10c and 10d, made of ITO (indium-tin oxide) or the like, are formed on the outsides of the orientation films 10e and 10f, respectively. Glass substrates 10a and 10b, acting as protective layers, are formed in outermost portions.

In this structure, each of the transparent electrodes 10c and 10d are divided into patterned electrodes corresponding to the distribution of the wavefront aberration as described later. The transparent electrode 10c is used to compensate for wavefront aberration due to a tilt of the optical axis in the radial direction. The transparent electrode 10d is employed to compensate for wavefront aberration due to a tilt of the optical axis in the tangential direction.

Figure 2A:
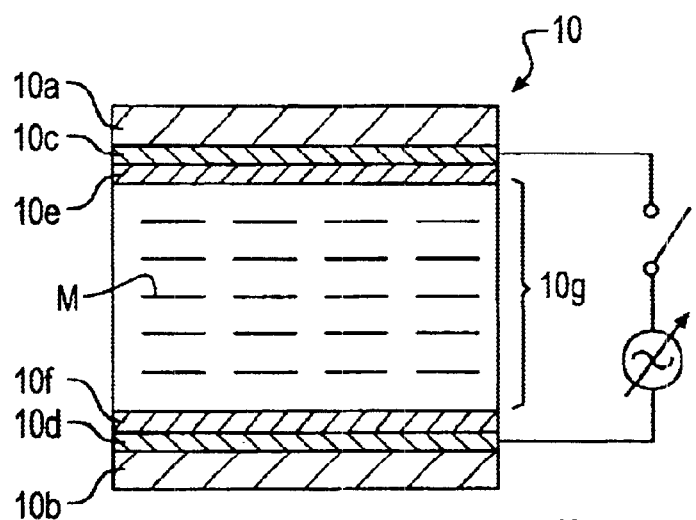
FIG. 2A is a vertical cross section of a liquid-crystal panel shown in FIG. 1, and in which liquid crystal molecules are in a horizontal state.
Figure 2B:
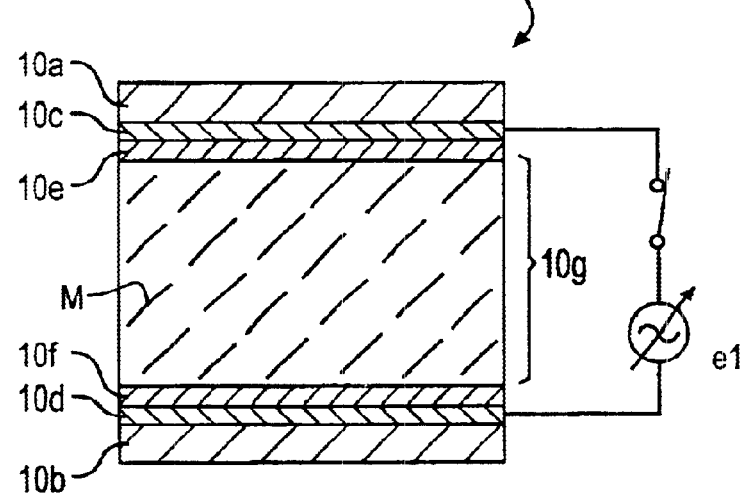
FIG. 2B is a vertical cross section similar to FIG. 2A, and in which the liquid crystal molecules are in an oblique state.
Figure 2C:
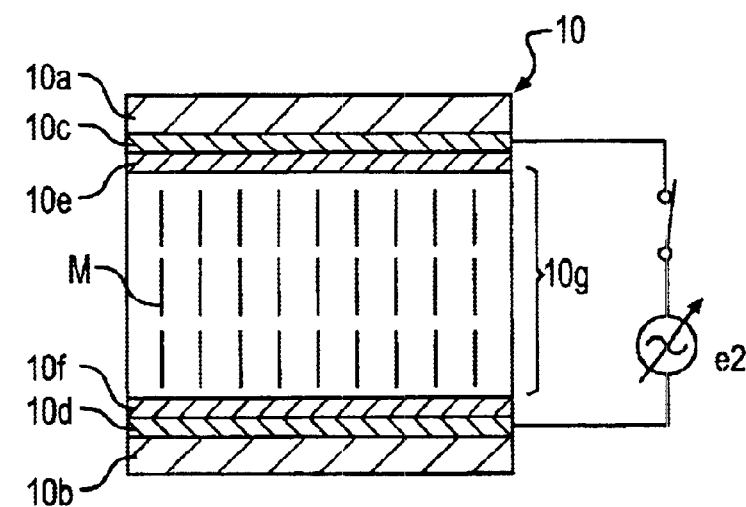
FIG. 2C is a vertical cross section similar to FIG. 2A, and in which the liquid crystal molecules are in a vertical state.

The liquid crystal material 10g has a different index of refraction between the direction of the optical axis of the liquid crystal molecules M and the direction perpendicular thereto. That is, the liquid crystal material 10g has birefringence. As shown in FIGS. 2A–2C, the orientation of the liquid crystal molecules M can be arbitrarily varied from horizontal to vertical direction by varying the voltages applied to the transparent electrodes 10c and 10d.

The CPU 21 calculates the driving signals Sdv1 and Sdv2 to be applied to the patterned electrodes of the transparent electrodes 10c and 10d according to the tilt detection signals Sp1 and Sp2. The calculated driving signals are sent to the liquid-crystal panel 10.

Figure 3A:
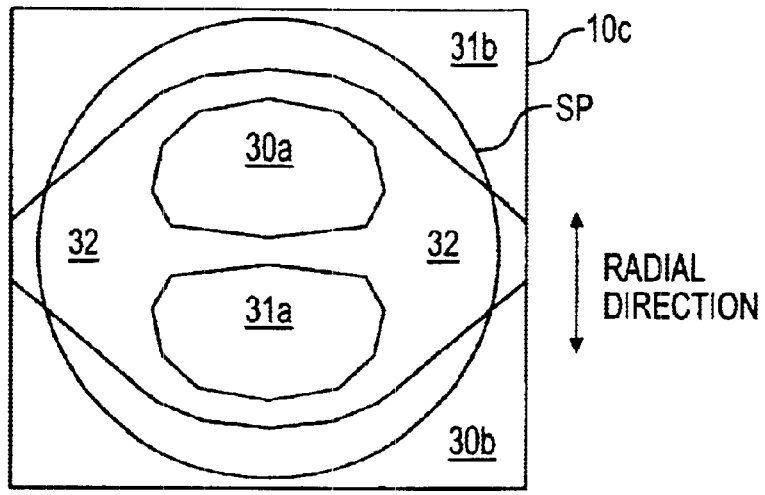
FIG. 3A is a plan view of first transparent patterned electrodes in accordance with an embodiment of the invention.
Figure 3B:
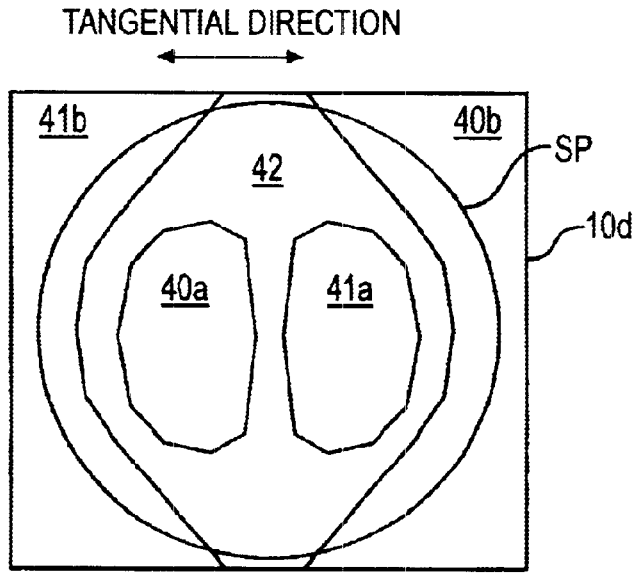
FIG. 3B is a plan view of second transparent patterned electrodes in accordance with an embodiment of the present invention.

The structures of the transparent electrodes 10c and 10d are next described by referring to FIGS. 3A and 3B.

As shown in FIG. 3A, the transparent electrode 10c is divided into five patterned electrodes 30a, 30b, 31a, 31b, and 32, which are arranged in line symmetry and electrically insulated from each other. Of these five electrodes, the electrodes 30a and 30b are activated by the same driving signal while the electrodes 31a and 31b are activated by the same driving signal.

The transparent electrode 10c is divided into the segments activated independently, as shown in FIG. 3A, to bring the patterned electrodes into agreement with the distribution of the wavefront aberration produced in the radial direction. The optical beam B impinges on an area SP of the transparent electrode 10c as shown in FIG. 3A. The size of the transparent electrode 10c is chosen so as to fully cover the illuminated area SP, as shown in FIG. 3A.

As shown in FIG. 3B, the transparent electrode 10d is divided into five patterned electrodes 40a, 40b, 41a, 41b, and 42 arranged in line symmetry. These electrodes are electrically insulated from each other. Of these electrodes, the electrodes 40a and 40b are activated by the same driving signal and the electrodes 41a and 41b are activated by the same driving signal. Similar to the transparent electrode 10c, the transparent electrode 10d is segmented as shown in FIG. 3B to bring the patterned electrodes into agreement with the distribution of the wavefront aberration produced in the tangential direction, as described later. The optical beam B impinges on an area SP of the transparent electrode 10d as shown in FIG. 3B. The size of the transparent electrode 10d is so chosen as to fully cover the illuminated area SP, as shown in FIG. 3B.

The principle on which the liquid-crystal panel 10 compensates for the wavefront aberration due to the tilt angle of the DVD 5 and factors determining the shapes of the patterned electrodes are next described. In the description given below, wavefront aberration produced due to a tilt of the optical axis in the radial direction is compensated. That is, the driving signal Sdv1 is applied to the transparent electrode 10c to compensate for the wavefront aberration.

Let W (r,φ) be wavefront aberration at the pupil plane of the objective lens 4. Note that (r,φ) indicates polar coordinates in the pupil plane.

If the DVD 5 is tilted relative to the axis of the optical beam B (i.e., there is a tilt angle), wavefront aberration (chiefly coma aberration) is produced as mentioned above. This makes it impossible for objective lens 4 to focus the optical beam B sufficiently. Let Wtlt(r,φ) be the wavefront aberration due to the tilt angle. A wavefront aberration given by Eq. (1) accounts for most of the wavefront aberration Wtlt(r,φ).

$$Wtlt(r,\phi) \cong \omega_{31} \times \cos \phi + \omega_{11} \times r \times \cos \phi \quad (1)$$

where $\omega_{31}$ and $\omega_{11}$ are constants determined by the tilt angle of the DVD 5, the thickness of the plates, the refractive index of the plates, and the numerical aperture (NA) of the objective lens 4 $\omega_{31}$ indicates the coma aberration. $\omega_{11}$ indicates an aberration caused by motion of an image point. The distribution of wavefront aberrations at the pupil plane was calculated using this mathematical formula. The results correspond to the distribution of the wavefront aberrations (due to the tilt angle in the radial direction as described later) shown in FIG. 4.

Let Wrms be the standard deviation of the wavefront aberration W(r,φ) at the pupil plane. This standard deviation is given by $$Wrms = \sqrt{\frac{\iint (W(r,\phi) - W_0^2) r \, dr \, d\phi}{\pi}} \quad (2)$$

where $W_0$ is the average value of W(r,φ) at the pupil plane. This standard deviation Wrms is used in evaluating wavefront aberration. Reducing the standard deviation Wrms decreases the effects of wavefront aberrations, permitting better reproduction.

As can be seen from Eq. (2) above, the wavefront aberration can be compensated by reducing the W(r,φ). The aforementioned Wtlt(r,φ) is produced due to tilt of the DVD 5 in the radial direction. To compensate for the Wtlt(r,φ), the voltage of the driving signal Sdv1 applied to each of the patterned electrodes of the transparent electrode 10c in the liquid-crystal panel 10 is controlled. If the index of refraction of an area of the liquid crystal material 10g corresponding to a certain electrode is varied by Δn', an optical path difference Δn'×d (where d is the thickness of the liquid crystal material layer 10g) can be given to the optical beam B transmitted through the area corresponding to the certain electrode.

Let Wlc(r,φ) be the optical path difference introduced by the liquid crystal material layer 10g. Wavefront aberration W(r,φ) at the pupil plane of the objective lens 4 when the liquid-crystal panel 10 is placed in position is given by $$W(r,\phi) = Wtlt(r,\phi) + Wlc(r,\phi) \quad (3)$$

As can be seen from this Eq. (3), the wavefront aberration Wtlt (r,φ) due to the tilt angle of the DVD 5 can be canceled by establishing the following relationship:

$$W(r,\phi) = Wtlt(r,\phi) + Wlc(r,\phi) = 0 \quad (4)$$

That is, the liquid crystal material 10g should give a wavefront aberration having opposite polarity, i.e., 180° out of phase with the Wtlt(r,φ) due to the tilt angle of the DVD 5 to the optical beam B. This out-of-phase wavefront aberration is given by:

$$Wlc(r,\phi) = -Wtlt(r,\phi) \quad (5)$$

Figure 4:
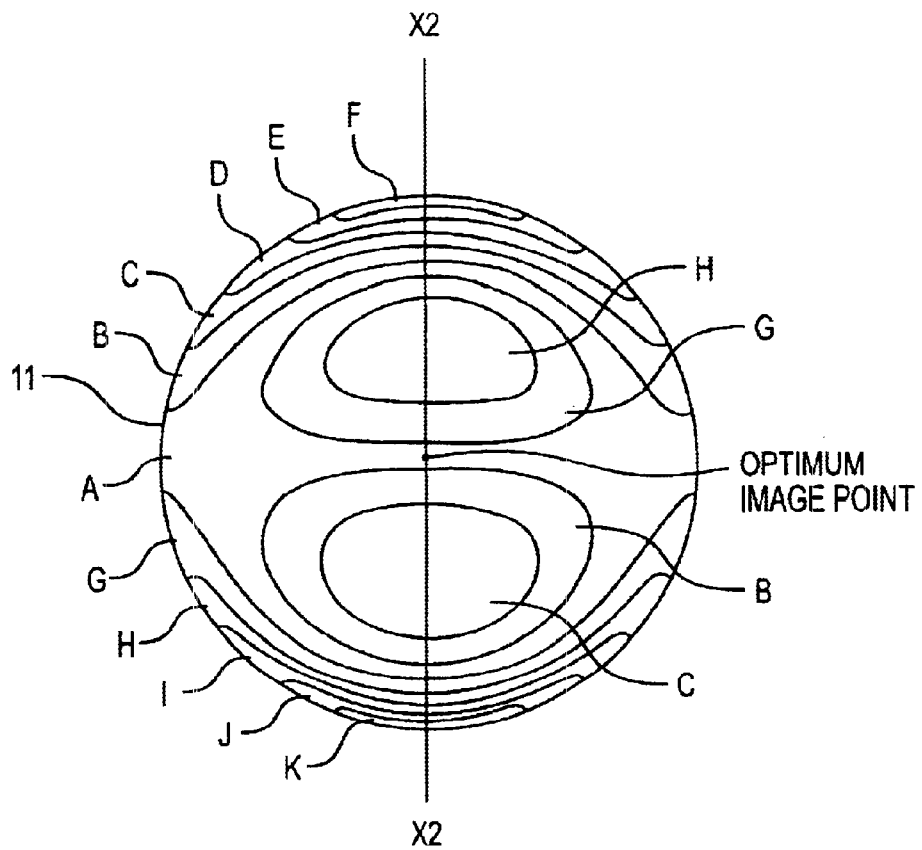
FIG. 4 is a diagram illustrating the distribution of wavefront aberrations.

Accordingly, the wavefront aberration Wlc(r,φ) which needs to be 180° out of phase with the wavefront aberration Wtlt(r,φ)) due to the tilt angle of the DVD 5 can be given as follows. The patterned electrodes are formed to segment the liquid crystal material 10g corresponding to the distribution of the wavefront aberration due to the tilt angle of the DVD 5 in the radial direction, as shown in FIG. 4. The voltage applied to an area corresponding to each electrode is so controlled as to give the wavefront aberration 180° out of phase with the wavefront aberration due to the tilt angle.

FIG. 4 shows the distribution of wavefront aberrations due to tilt of the optical axis in the radial direction as viewed in the pupil plane of the objective lens 4. Specifically, in FIG. 4, the recording surface of the DVD 5 is tilted by +1° in the radial direction. In this case, the distribution of wavefront aberrations at the optimum image point of the light spot is shown within the maximum region illuminated by the incident optical beam B. A region A having wavefront aberration values of −25 nm to +25 nm is located in the center. Various regions A–K each having a range of 50 nm are delineated by boundary lines. Axis X2-X2 in FIG. 4 corresponds to the radial direction in which the DVD 5 is tilted.

Figure 5:
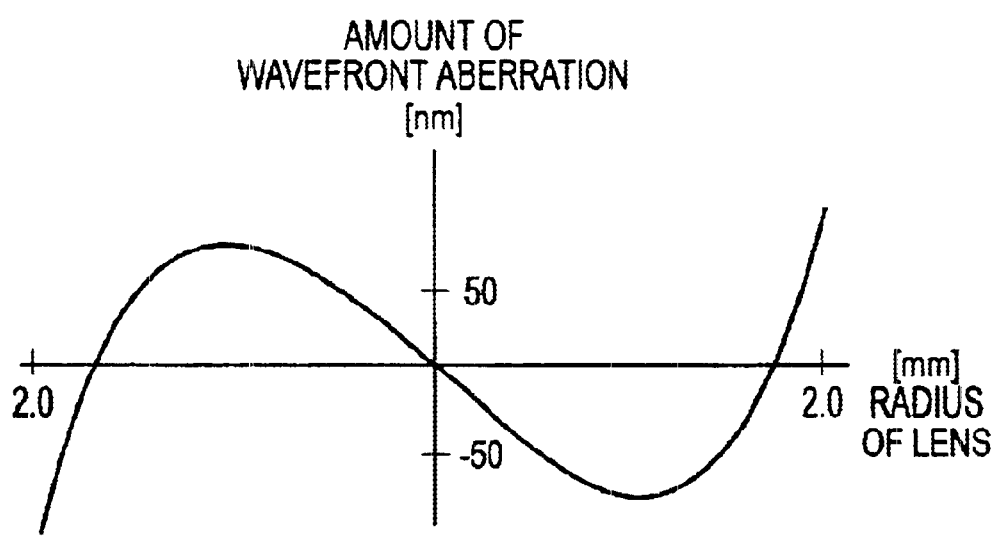
FIG. 5 is a graph illustrating the magnitude of wavefront aberration.
Figure 6A:
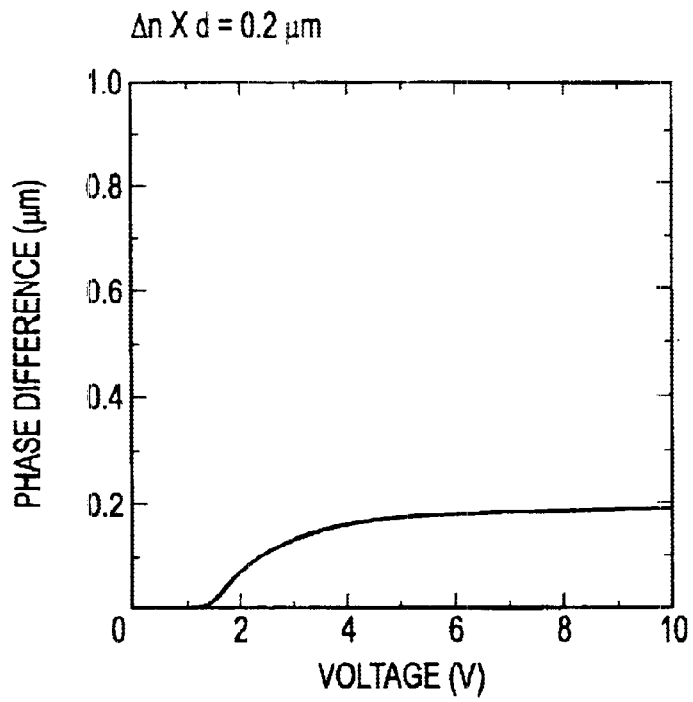
FIG. 6A is a graph in which a phase difference capable of being produced is plotted against an applied voltage, and in which the phase difference, $\Delta n \times d$, is 0.2 μm.
Figure 6B:
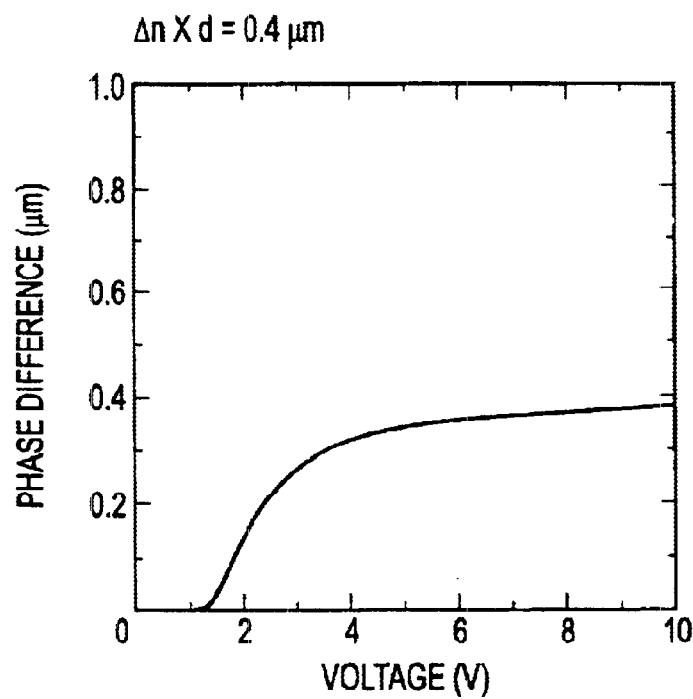
FIG. 6B is a graph similar to FIG. 6A, but the phase difference, $\Delta n \times d$, is 0.4 μm.
Figure 7A:
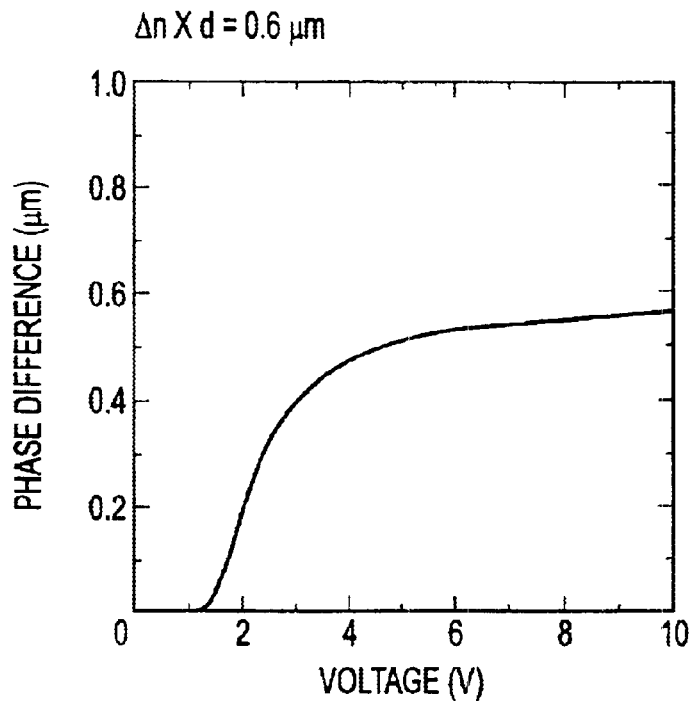
FIG. 7A is a graph similar to FIG. 6A, but the phase difference, $\Delta n \times d$, is 0.6 μm.
Figure 7B:
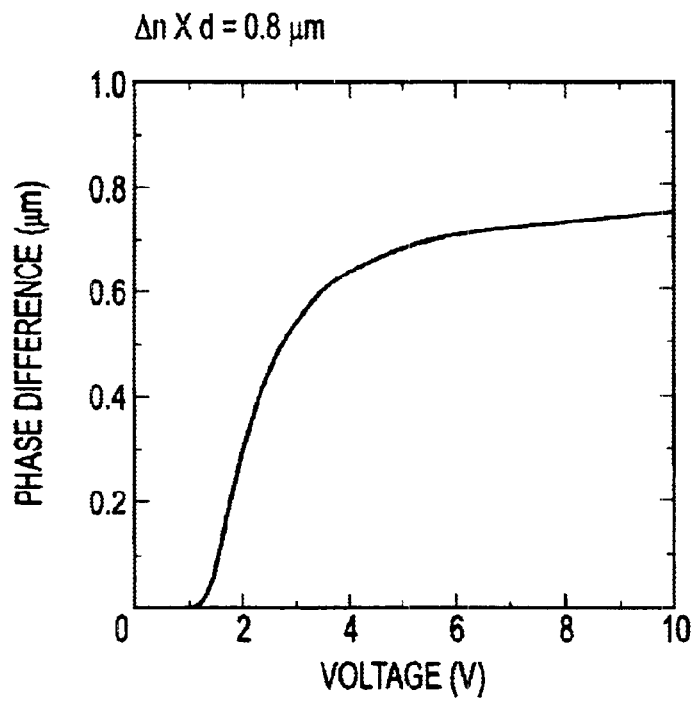
FIG. 7B is a graph similar to FIG. 7A, but the phase difference, $\Delta n \times d$, is 0.8 μm.
Figure 8A:
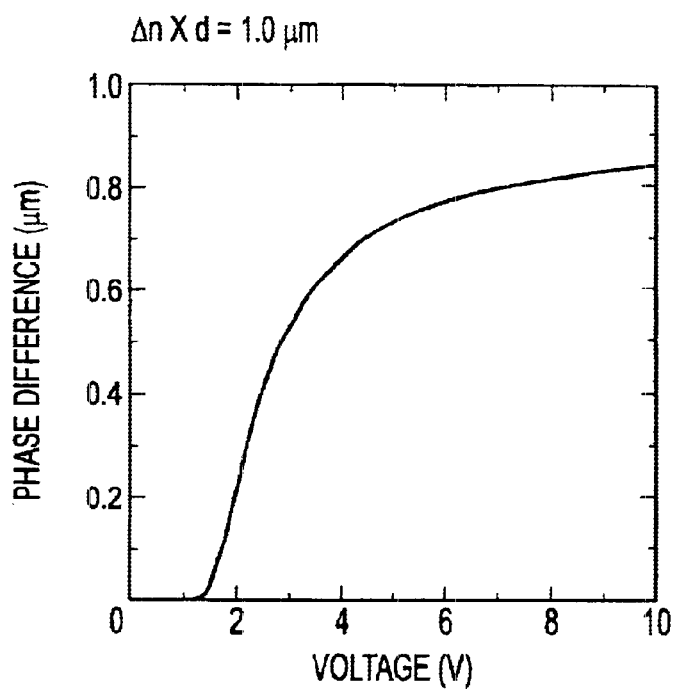
FIG. 8A is a graph similar to FIG. 6A, but the phase difference, $\Delta n \times d$, is 1.0 μm.
Figure 8B:
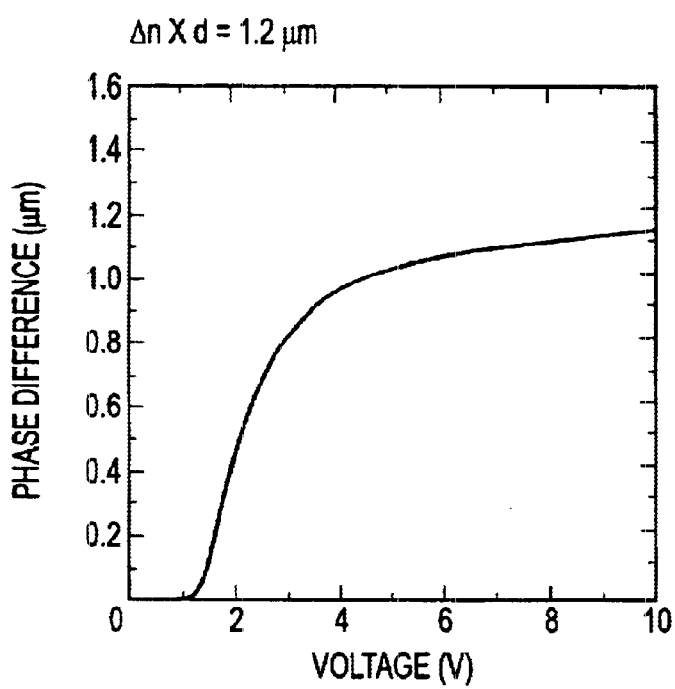
FIG. 8B is a graph similar to FIG. 8A, but the phase difference, $\Delta n \times d$, is 1.2 μm.

FIG. 5 shows the distribution characteristic of the wavefront aberrations on the axis X2-X2. The distribution of the wavefront aberrations is uniform, irrespective of the amount of the tilt angle. The amount of wavefront aberration is affected by the amount of the tilt angle and is described by referring to the graph of FIG. 5. The peak value of the curve in this graph increases as the tilt angle increases, and decreases as the tilt angle decreases.

In view of the distribution of wavefront aberrations, the transparent electrode 10c is patterned analogously to the waveform aberration distribution shown in FIG. 4 in the present embodiment. The liquid crystal material 10g corresponding to each electrode of the patterned electrodes gives a phase difference (i.e., the light path difference Δn'×d) to the optical beam B so as to cancel the produced wavefront aberration Wtlt(r,φ). Thus, the wavefront aberration Wtlt(r, φ) due to the tilt angle can sufficiently be reduced to the extent that it no longer affects the reading of the information from the DVD 5.

The voltage applied to each segment of the liquid crystal material 10g corresponding to each of the patterned electrodes is controlled to vary the orientation of the liquid crystal molecules M. A phase difference is given to the optical beam B by varying the index of refraction of each segment. In this way, the wavefront aberration Wtlt(r,φ) produced due to the tilt of the disk 5 is compensated.

As described thus far, the patterned electrodes shown in FIG. 3A are determined according to the wavefront aberration distribution (see FIG. 4) when the recording surface of the DVD 5 is tilted by +1° in the radial direction. The transparent electrode 10c has five electrodes corresponding to a case in which the wavefront aberrations are approximated by five values.

A region corresponding to the electrode 32 includes a region where the wavefront aberration assumes a value of 0. Regions of the liquid crystal material 10g corresponding to the electrodes 30b and 31b, respectively, are symmetrical, but the transmitted optical beam B is 180° out of phase (i.e., opposite polarity). Furthermore, regions of the liquid crystal material 10g corresponding to the electrode 30a and 31a, respectively, are symmetrical, but the transmitted optical beam B is 180° out of phase.

The liquid crystal material 10g may be segmented into more electrodes so that the wavefront aberration due to the tilt angle of the DVD 5 would be completely canceled. However, if the liquid crystal material 10g is patterned into rows and columns, it is necessary to control the driving signal applied to each electrode, and hence the transparent electrode 10c must also be divided into rows and columns. This makes it difficult to create the transparent patterned electrodes 10c and conductive interconnects.

Accordingly, in the liquid-crystal panel 10 in accordance with the present embodiment, the transparent electrode 10c is segmented analogously to the waveform aberration distribution, as shown in FIG. 3A. Consequently, the patterned electrodes are easy to fabricate. Furthermore, the wavefront aberration can be efficiently compensated.

In the description already given in connection with FIGS. 3A, 4 and 5, wavefront aberrations produced in the radial direction of the DVD 5 are compensated. Wavefront aberration produced in the tangential direction of the DVD 5 can similarly be compensated. In such a case, the patterned electrodes of the transparent electrode 10c are rotated through 90°, and the above-described principle is applied to the transparent electrode 10d. As a result, wavefront aberration due to a tilt of the optical axis in the tangential direction is compensated using the transparent patterned electrodes 10d as shown in FIG. 3B.

Accordingly, the pattern of the electrodes 40a, 40b, 41a, 41b, and 42 of the transparent electrode 10d are analogous to the wavefront aberration distribution (where the axis X2-X2 shown in FIG. 4 is taken as the tangential direction) and symmetrical with respect to an axis parallel to the tangential direction.

The manner in which the thickness of the liquid crystal material 10g is determined is next described by referring to FIGS. 6A–10. In the present embodiment, the thickness d of the liquid crystal material 10g is determined in relation to the index of birefringence $\Delta n$ (the maximum value of the aforementioned index of refraction $\Delta n'$ capable of being varied by applying a voltage) of the liquid crystal material 10g. For example, E63, E70, E90, and MLC-6800-100 produced by Merck Ltd. as listed in Table 1 can be used as the liquid crystal material 10g.

TABLE 1

| type | E63 | E70 | E90 | MLC-6800-100 |
|---|---|---|---|---|
| $\Delta n$ | +0.3373 | +0.1873 | +0.2063 | +0.1717 |

The index of birefringence $\Delta n$ of each liquid crystal material assumes a value as listed in Table 1. In the liquid-crystal panel 10 of this embodiment, the thickness d of the liquid crystal material 10g is set such that the maximum value of a phase difference capable of being imparted to the optical beam B by the liquid-crystal panel 10 (i.e., the product of the index of birefringence $\Delta n$ and thickness d of the liquid crystal material 10g, in $\mu$m) is between 0.6 $\mu$m and 1.2 $\mu$m. This maximum value will hereinafter be referred to as the phase difference $\Delta n \times d$.

The phase difference $\Delta n \times d$ is set to be between 0.6 and 1.2 $\mu$m for the following reason. As mentioned above, the phase difference $\Delta n \times d$ is a maximum value of a phase difference that can be imparted to the optical beam B by applying a voltage across the liquid crystal material 10g. FIGS. 6A–9B show relations between the voltage applied across the liquid crystal material 10g and a phase difference actually induced in the optical beam B by this voltage at different values of the phase difference $\Delta n \times d$. In this embodiment, the optical beam for the DVD 5 is used.

Figure 10:
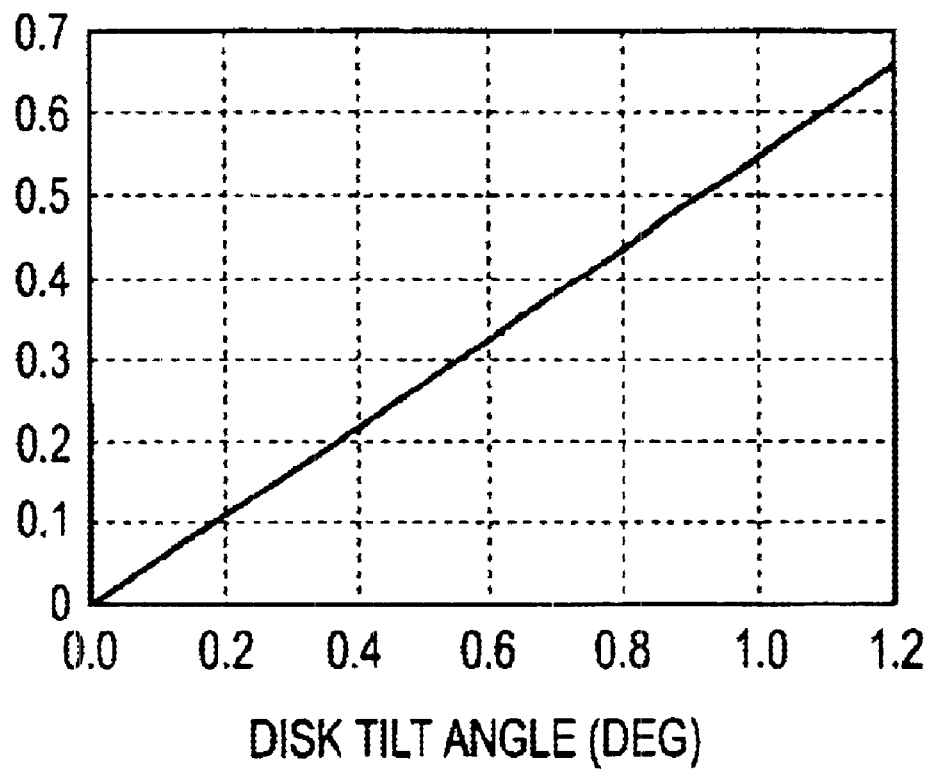
FIG. 10 is a graph in which an amount of phase difference necessary for compensation of wavefront aberration is plotted against DVD tilt angles.

On the other hand, FIG. 10 illustrates the relation between the tilt angle produced in the DVD 5 and the phase difference that needs to be imparted to the optical beam B to compensate for the wavefront aberration produced due to the tilt in the case of the optical beam for the DVD 5.

Since the tilt angle in the actual DVD 5 is unlikely to exceed 1 degree, a phase difference of up to about 0.5 $\mu$m should be given to the optical beam B in order to compensate for the wavefront aberration due to the tilt, as can be seen from the description in connection with Eq. (1) and FIG. 10.

Referring to FIGS. 6A–9B, where the phase difference $\Delta n \times d$ is 0.2 $\mu$m (FIG. 6A), a phase difference of up to 0.5 $\mu$m cannot be given to the optical beam B even if the applied voltage is increased.

Where the phase difference $\Delta n \times d$ is 0.4 $\mu$m (FIG. 6B), a phase difference of up to 0.4 $\mu$m can be given to the optical beam B if the applied voltage is set to 4 V or greater. Under normal conditions (i.e., the information reproducing system S is used under normal environments), if compensation is made up to a tilt angle of about 0.5°, then it is satisfactory in practical applications. Therefore, where the phase difference $\Delta n \times d$ is 0.4 $\mu$m, wavefront aberration due to tilt can be compensated within a practically satisfactory range.

Figure 9A:
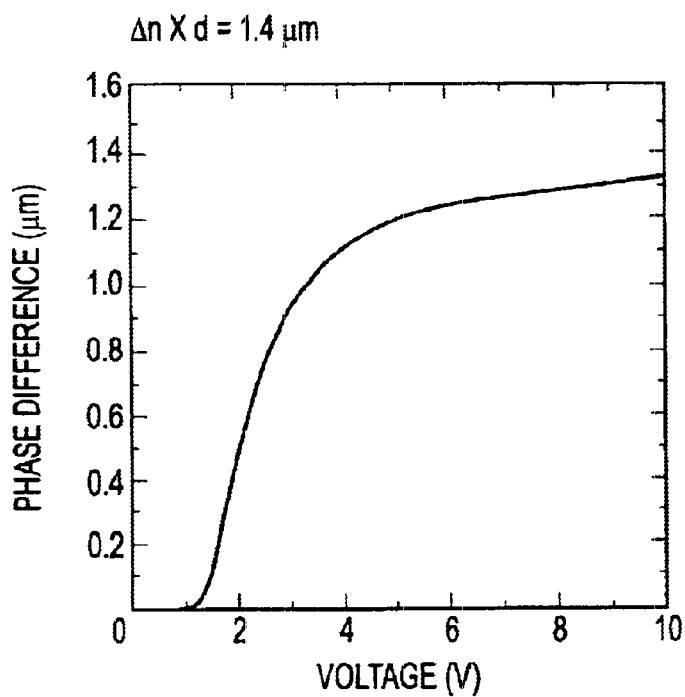
FIG. 9A is a graph similar to FIG. 6A, but the phase difference, $\Delta n \times d$, is 1.4 μm.
Figure 9B:
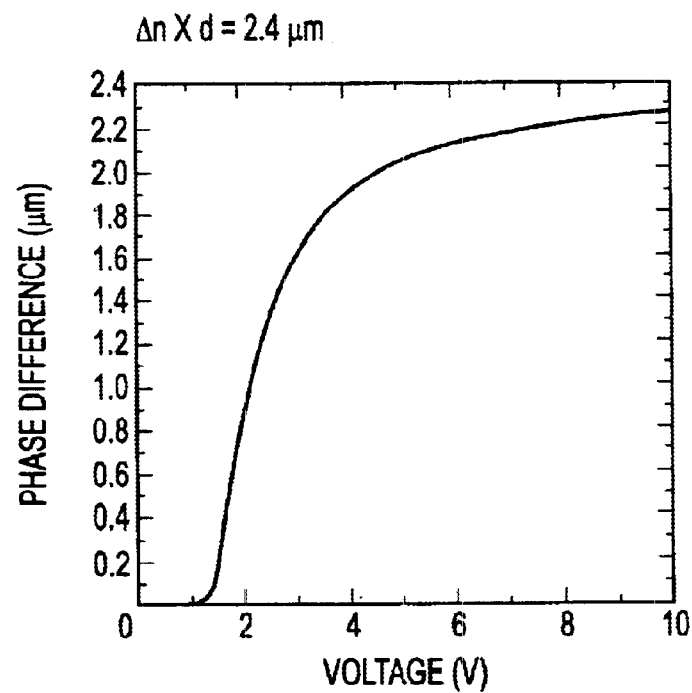
FIG. 9B is a graph similar to FIG. 9A, but the phase difference, $\Delta n \times d$, is 2.4 μm.

In this case, however, if the applied voltage exceeds 2.5 V, the phase difference no longer varies substantially linearly. That is, when the applied voltage exceeds 2.5 V, it is necessary to vary the applied voltage in accordance with a higher-order function in order to give the necessary phase difference to the optical beam B. In this situation, the CPU 21 needs to control the voltage in a complex manner.

Where the phase difference $\Delta n \times d$ is between 0.6 $\mu$m and 1.2 $\mu$m (FIGS. 7A–8B), the phase difference imparted to the optical beam B varies almost linearly in response to variations in the applied voltage as long as the phase difference given to the optical beam is 0.5 $\mu$m or less. Accordingly, in this case, it suffices to vary the applied voltage linearly in order to give the necessary phase difference to the optical beam B. Consequently, the CPU 21 is not required to control the voltage in a complex manner.

Where the phase difference $\Delta n \times d$ is 1.4 $\mu$m or 2.4 $\mu$m as shown in FIGS. 9A and 9B, the phase difference given to the optical beam B in response to variations in the applied voltage varies almost linearly as long as the phase difference is 0.5 $\mu$m or less. Thus, it is easy to control the applied voltage for giving the necessary phase difference to the optical beam.

However, since the index of refraction $\Delta n$ is uniform across the liquid crystal material 10g, if the phase difference $\Delta n \times d$ is set to a larger value of 1.4 $\mu$m or 2.4 $\mu$m, the thickness d of the liquid crystal material layer 10g is increased accordingly. This in turn deteriorates the response of the liquid crystal material 10g.

For the reasons described above, in this embodiment, the phase difference $\Delta n \times d$ (a value corresponding to the thickness d of the liquid crystal material 10g) is set between 0.6

μm and 1.2 μm. In this range, the necessary phase difference can be imparted to the optical beam B by a simple voltage control method without deteriorating the response of the liquid crystal material 10g.

Figure 11:
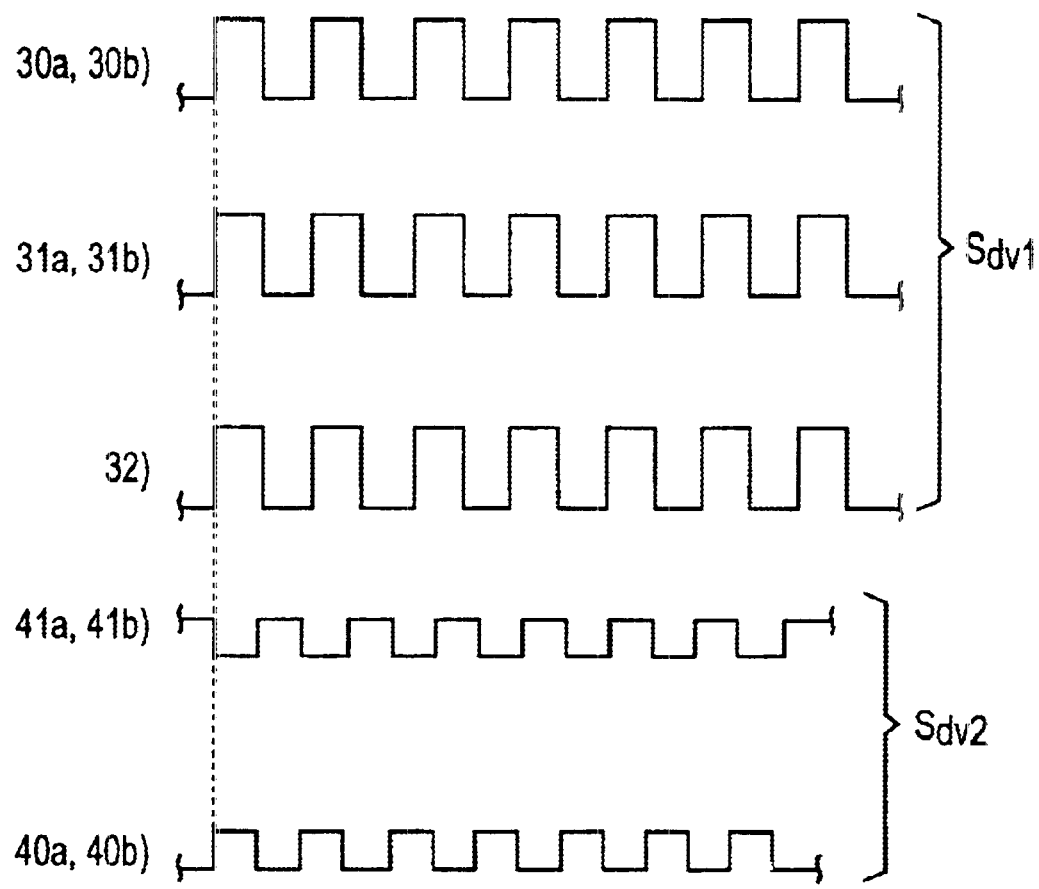
FIG. 11 is a timing chart illustrating a driving signal waveform applied to each patterned electrode in accordance with an embodiment of the present invention.
Figure 12:
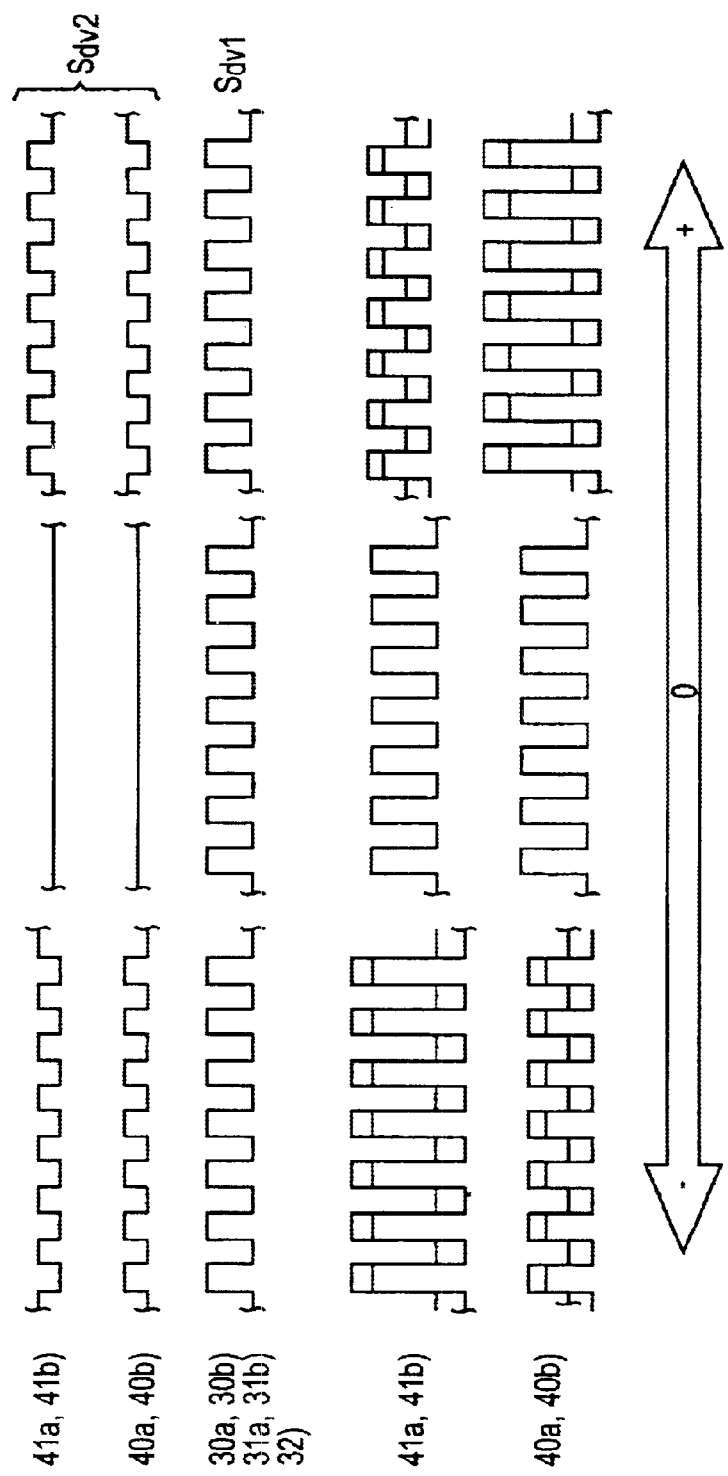
FIG. 12 is a diagram illustrating potential differences applied across a liquid crystal material in accordance with an embodiment of the present invention.

Referring to FIGS. 11 and 12, the drive of the liquid crystal material 10g by the application of the driving signals Sdv1 and Sdv2 to the transparent electrodes 10c and 10d is next explained. In the following embodiment, only wavefront aberration produced in the tangential direction of the DVD 5 is compensated, and wavefront aberration produced due to a tilt of the optical axis in the radial direction of the DVD 5 is not compensated. That is, it is described in a case where the tilt angle in the radial direction is 0° and only a tilt angle in the tangential direction is present on the disk.

FIG. 11 shows the waveforms of driving signals Sdv1 and Sdv2 applied to the patterned electrodes of the transparent electrodes 10c and 10d. FIG. 12 shows variations in the driving signals Sdv1 and Sdv2 applied to the patterned electrodes where the tilt angle varies in the tangential direction.

As shown in FIG. 11, when only wavefront aberration produced due to a tilt of the optical axis in the tangential direction is compensated, the same driving signal Sdv1 is applied to each of the patterned electrodes. In such a case, the driving signal Sdv1 gives a reference for a potential difference applied across the liquid crystal material 10g. In particular, the same driving signal Sdv1 as shown in the top three waveforms in FIG. 11 is applied to the patterned electrodes 30a, 30b, 31a, 31b, and 32. This driving signal Sdv1 corresponds to a driving signal applied to the transparent electrode 10c where the tilt angle in the radial direction is 0°.

When the driving signal Sdv1 of the waveforms in FIG. 11 is applied, the signal gives a common reference phase difference to the whole region of the optical beam B passing through the liquid-crystal panel 10 without varying the wavefront of the optical beam. That is, the driving signal Sdv1 gives the phase difference that produces the same effect as where the optical beam B is transmitted through a glass plate.

Where the tilt angles in the radial and tangential directions are both 0°, the driving signal Sdv1 shown in FIG. 11 is applied to every electrode of the transparent electrode 10c, while each of the patterned electrodes of the transparent electrode 10d is grounded.

On the other hand, the driving signal Sdv2 of the waveform shown in last two waveforms in FIG. 11 is applied to the transparent electrode 10d to compensate for wavefront aberration due to tilt of the optical axis in the tangential direction.

The driving signal Sdv2 shown in FIG. 11 reduces the phase difference given to the optical beam B in the regions of the liquid crystal material 10g corresponding to the electrodes 40a and 40b for compensating wavefront aberration produced due to the tilt angle. Conversely, the driving signal Sdv2 increases the phase difference given to the optical beam B in the regions of the liquid-crystal material 10g corresponding to the electrodes 41a and 41b for compensating wavefront aberration attributed to the tilt angle.

In this case, the phase difference given to the optical beam needs to be larger than the reference phase difference in the regions of the liquid crystal material 10g corresponding to the electrodes 41a and 41b. Consequently, it is necessary to increase the potential difference applied to these regions of the liquid crystal material 10g. Therefore, as shown in the fourth waveform of FIG. 11, the driving signal Sdv2 is 180° out of phase with the driving signal Sdv1 and is applied to the electrodes 41a and 41b.

On the other hand, at the electrodes 40a and 40b, it is necessary to make the phase difference imparted to the optical beam B smaller than the reference phase difference. Hence, as shown in the last waveform of FIG. 11, the driving signal Sdv2 is in phase with the driving signal Sdv1 and is applied to the electrodes 40a and 40b.

In this way, the driving signal Sdv2 that is 180° out of phase with the driving signal Sdv1 is applied to the electrodes 41a and 41b, and the driving signal Sdv2 that is in phase with the driving signal Sdv1 is applied to the electrodes 40a and 40b. As a result, a potential difference necessary to give the phase difference to the optical beam required to compensate for wavefront aberration is produced across the liquid crystal material 10g.

The voltage of the driving signal Sdv2 applied to the electrodes 41a, 41b, 40a, and 40b is set corresponding to the phase difference given to the optical beam B by the liquid crystal material 10g. The phase difference is calculated by the CPU 21 based on the tilt detection signal Sp2 indicative of the tilt angle in the tangential direction.

More specifically, as the tilt angle increases, the phase difference necessary for compensation of wavefront aberration increases. Therefore, the potential difference to be applied across the liquid crystal material 10g needs to be increased. Accordingly, the amplitude of the driving signal Sdv2 is increased. The potential difference applied across the liquid crystal material 10g is the difference between the maximum value and the minimum value of the amplitude. The electrode 42 is grounded, because the amount of wavefront aberration due to a tilt angle in the region corresponding to the electrode 42 is so small that no compensation is needed.

The manner in which the driving signal Sdv2 applied to each electrode of the transparent electrode 10d varies when the tilt angle in the tangential direction varies is next described by referring to FIG. 12.

In FIG. 12, the tilt angle in the tangential direction varies from 0 (i.e., the angle between the optical axis of the optical beam B and the tangential direction of the recording surface of the DVD 5 is rectangular, which is an ideal case) to either positive or negative direction. The top three waveforms of FIG. 12 show variations in the waveforms of the driving signals Sdv1 and Sdv2 applied to each of the patterned electrodes of the transparent electrodes 10c and 10d. The fourth and the last waveforms show actual variations in the potential difference applied to regions of the liquid crystal material 10g corresponding to the electrodes 40a, 40b, 41a, and 41b. That is, the fourth and the last waveforms show variations in the phase differences given to optical beam B passing through regions of the liquid crystal material 10g corresponding to the electrodes 40a, 40b, 41a, and 41b. The bold arrows in FIG. 12 show variations in the tilt angle. That is, the right arrow indicates a positive change, the left arrow indicates a negative change, and the center indicates a null tilt angle.

A tilt angle producing a negative wavefront aberration in regions of the optical spot SP corresponding to the electrodes 40a and 40b is defined to be positive. Conversely, a tilt angle producing a positive wavefront aberration in regions of the optical spot SP corresponding to the electrodes 40a and 40b is defined to be negative.

A case of the null tilt angle is first discussed. In this case, the driving signal Sdv2 is not applied to any of the electrodes 40a, 40b, 41a, and 41b. As a result, a voltage owing to only the driving signal Sdv1 is applied to the liquid crystal material 10g. Thus, the potential difference applied across the liquid crystal material 10g is attributed only to the driving signal Sdv1. The reference phase difference is given to the whole region of the optical spot SP of the optical beam B. The beam B passes through the liquid-crystal panel 10 such that its wavefront is not affected, and reaches the DVD 5.

A case where the DVD 5 tilts and the tilt angle increases in the positive direction is next discussed. This time, the driving signal Sdv2 having waveforms shown at the right sides of the first two stages in FIG. 12 is applied to the electrodes 40a, 40b, 41a, and 41b in response to the tilt detection signal Sp2, which is indicative of the tilt angle.

That is, in this case, a phase difference greater than the reference phase difference needs to be applied to regions of the liquid crystal material 10g corresponding to the electrodes 40a and 40b of the transparent electrode 10d in order to compensate for the wavefront aberration. This compensation is made based on the wavefront aberration distribution due to the tilt angle in the tangential direction. That is, a potential difference greater than the potential difference for producing the reference phase difference needs to be applied to regions of the liquid crystal material 10g corresponding to the electrodes 40a and 40b. Therefore, as shown at the right of the second stage in FIG. 12, the driving signal Sdv2 is being applied to electrodes 40a and 40b. In fact, this driving signal Sdv2 is 180° out of phase with the driving signal Sdv1, which is applied to the opposite transparent electrode 10c.

On the other hand, a phase difference smaller than the reference phase difference needs to be applied to regions of the liquid crystal material 10g corresponding to the electrodes 41a and 41b of the transparent electrode 10d in order to compensate wavefront aberration. This is also based on the wavefront aberration distribution due to the tilt angle in the tangential direction. That is, a potential difference smaller than the potential difference for producing the reference phase difference is required to be applied to regions of the liquid crystal material 10g corresponding to the electrodes 41a and 41b. Accordingly, as shown at the right of the top stage in FIG. 12, the driving signal Sdv2 is applied to the electrodes 41a and 41b. In fact, this driving signal Sdv2 is in phase with the driving signal Sdv1, which is applied to the opposite transparent electrode 10c.

Also, in this case, the driving signal Sdv1 of the waveform shown at the third stage in FIG. 12 is applied to all electrodes of the transparent electrode 10c. Therefore, the potential difference applied to regions of the liquid crystal material 10 g corresponding to the electrodes 41a and 41b have a small amplitude as shown at the right of the fourth stage in FIG. 12. On the other hand, the potential difference applied to regions of the liquid crystal material 10g corresponding to the electrodes 40a and 40b has a large amplitude as shown at the right of the last stage in FIG. 12.

Accordingly, the phase difference given to the optical beam B passing through the regions corresponding to the electrodes 41a and 41b by the liquid crystal material 10g is reduced. The phase difference given to the optical beam B passing through the regions corresponding to the electrodes 40a and 40b is increased. Consequently, a phase difference sufficient to compensate for the wavefront aberration due to the tilt angle in the positive direction is given to the optical beam B.

Where the tilt angle is produced in the negative direction, the above principles are similarly applied. In such a case, as shown at the left of the second stage in FIG. 12, the driving signal Sdv2 is applied to the electrodes 40a and 40b. This driving signal Sdv2 is in phase with the driving signal Sdv1, which is applied to the opposite transparent electrode 10c.

Moreover, as shown at the left of the top stage in FIG. 12, the driving signal Sdv2 is applied to the electrodes 41a and 41b. This driving signal Sdv2 is 180° out of phase with the driving signal Sdv1, which is applied to the opposite transparent electrode 10c.

In this manner, the waveform of the driving signal Sdv2, which is applied to the electrodes of the transparent Electrode 10d, varies depending on the tilt detection signal Sp2 indicative of the tilt angle in the tangential direction of the DVD 5. Consequently, the phase difference given to the optical beam B differs among regions of the liquid crystal material 10g. The wavefront aberration due to the tilt angle is thus canceled and compensated.

As described thus far, with this embodiment of the invention, a phase difference $\Delta n \times d$ of 0.6 μm or more can be produced in the liquid-crystal panel 10. This assures that wavefront aberration is sufficiently compensated. Furthermore, a range of the phase difference is enlarged in which the phase difference given to the optical beam B can be controlled almost linearly by the voltage applied to the liquid crystal material 10g. As a result, a phase difference corresponding to the amount of wavefront aberration can be introduced in the optical beam B by a simple voltage control.

Since the phase difference $\Delta n \times d$ is 1.2 μm or less, the liquid crystal material layer 10g does not become excessively thick. The wavefront aberration can be compensated reliably without impairing the high-speed response of the liquid crystal material 10g. In addition, the liquid-crystal panel 10 can be reduced in size.

Moreover, the phase difference $\Delta n \times d$ is set as to vary almost linearly with variations in the voltage according to the amount of wavefront aberration within a range of phase difference to be given to the optical beam B. This assures that the wavefront aberration is compensated. Also, a phase difference corresponding to the amount of wavefront aberration can be introduced in the optical beam B by a simple voltage control.

In addition, in accordance with the present embodiment, wavefront aberration is compensated reliably with the optical pickup 13. A phase difference corresponding to the amount of wavefront aberration can be introduced in the optical beam B by a simple voltage control. This prevents the information on the DVD 5 from being read incorrectly due to wavefront aberration. The wavefront aberration is compensated by a simple voltage control. Thus, information can be reproduced accurately from the DVD 5.

The transparent electrodes 10c and 10d are formed on opposite surfaces of the liquid crystal material layer 10g through which the optical beam B passes. The driving signal Sdv2 having an amplitude corresponding to a change in the tilt angle is applied to the transparent electrode 10d based on the tilt detection signal Sp2. Voltages applied to the electrodes of the transparent electrodes 10c and 10d are controlled in such a way that a phase difference for compensating wavefront aberration produced due to a tilt angle is given to the optical beam B. It follows that the potential difference applied across the liquid crystal material 10g varies according to the tilt detection signal Sp2. Hence, the wavefront aberration can be compensated with simple and small structure of a single liquid-crystal panel.

The transparent electrode 10d is patterned into electrodes 40a, 40b, 41a, 41b, and 42 that are shaped to correspond to the distribution of waveform aberration produced in the tangential direction of the DVD 5. The driving signal Sdv2 for producing a phase difference for compensating for wavefront aberration due to a tilt angle is applied to the electrodes independently. The potential difference applied across the liquid crystal material 10g differs among the positions of the electrodes. Thus, wavefront aberration produced tangentially of the DVD 5 can be effectively compensated.

Information recorded on the DVD 5 is reproduced using the optical beam B whose wavefront aberration has been compensated. Therefore, the information can be reproduced accurately.

In the embodiment described above, the phase difference $\Delta n \times d$ is set between 0.6 ×m and 1.2 µm. Where practical margins and variations in the index of refraction of the liquid crystal material 10g due to temperature variations are also taken into consideration, the thickness d of the liquid crystal material 10g can be set as long as the phase difference $\Delta n \times d$ lies between 0.4 µm and 2.0 µm. This can produce advantages similar to those yielded by the embodiment described above.

If the phase difference $\Delta n \times d$ is set equal to the maximum value of the amount of wavefront aberration to be compensated, it is assured that the wavefront aberration is compensated in the same way as in the embodiment described above. Furthermore, the range of the phase difference is enlarged in which the phase difference given to the optical beam B can be controlled almost linearly by the voltage applied to the liquid crystal material 10g. Thus, a phase difference corresponding to the amount of wavefront aberration to be compensated can be introduced in the optical beam B by a simple voltage control.

In addition, the liquid crystal material layer 10g does not need to be made excessively thick. Consequently, the liquid-crystal panel can be reduced in size.

In the above-described embodiment, the present invention is applied to the liquid-crystal panel 10 in the information reproducing system S. The invention can also be applied to an information recording system for recording information on a recording medium while reading addresses and other information from the medium. In the case of the recording apparatus, a liquid-crystal panel compensates for wavefront aberration produced within an area illuminated with the optical beam due to tilt of the optical axis of a writing optical beam relative to the recording surface of the recording medium.

In the above-described embodiment, only wavefront aberration due to the tilt angle in the tangential direction is compensated. However, wavefront aberration due to the tilt angle in the radial direction similarly can be compensated.

As described, in accordance with the present invention, the product of the index of birefringence of a liquid crystal material and the thickness of the layer of the liquid crystal material is 0.4 µm or more. This assures that wavefront aberration to be compensated is compensated. Furthermore, the range of the phase difference is enlarged in which the phase difference given to the optical beam can be controlled almost linearly by the voltage applied to the liquid crystal material. A phase difference corresponding to the amount of wavefront aberration to be compensated can be introduced in the optical beam by a simple voltage control. Consequently, a phase difference sufficient to compensate wavefront aberration can be given to the optical beam by a simple voltage control.

It will be apparent to those skilled in the art that various modifications and variations can be made in the liquid-crystal panel, optical pickup, and information reproducing system of the present invention without departing from the spirit or scope of the invention. Thus, it is intended that the present invention covers the modifications and variations of this invention provided they come withing the scope of the appended claims and their equivalents.

What is claimed is:

1. A liquid-crystal panel placed in an optical path of an optical beam from a light source to a recording surface of a recording medium, for compensating wavefront aberration of the optical beam by giving a phase difference to the optical beam, the liquid-crystal panel comprising:
    a layer of a liquid crystal material having an index of birefringence, wherein a product of the index of birefringence and thickness of the layer of the liquid crystal material is 0.4 µm or more.

2. The liquid-crystal panel according to claim 1, wherein the product is 0.6 µm or more.

3. The liquid-crystal panel according to claim 1, wherein the product is 2.0 µm or less.

4. The liquid-crystal panel according to claim 1, wherein the product is 1.2 µm or less.

5. The liquid crystal panel according to claim 1, wherein the wavefront aberration is produced due to tilt of the recording surface relative to an optical axis of the optical beam.

6. An optical pickup comprising:
    a light source for emitting an optical beam;
    a liquid-crystal panel placed in an optical path of the optical beam from the light source to a recording surface of a recording medium, for compensating wavefront aberration of the optical beam by giving a phase difference to the optical beam in accordance with an applied voltage, the liquid-crystal panel including a layer of a liquid crystal material having an index of birefringence, a product of the index of birefringence and thickness of the layer of the liquid crystal material being 0.4 µm or more;
    an objective lens for focusing the optical beam transmitted through the liquid-crystal panel onto the recording medium; and
    a light-receiving means for receiving the optical beam reflected from the recording medium and for producing an output signal representing the received beam.

7. An information reproducing system comprising:
    a light source for emitting an optical beam;
    a liquid-crystal panel placed in an optical path of the optical beam from the light source to a recording surface of a recording medium, for compensating wavefront aberration of the optical beam by giving a phase difference to the optical beam, the liquid-crystal panel including a layer of a liquid crystal material having an index of birefringence, a product of the index of birefringence and thickness of the layer of the liquid crystal material being 0.4 µm or more;
    a voltage application means for applying a voltage across the liquid-crystal panel to give the phase difference to the optical beam;
    an objective lens for focusing the optical beam transmitted through the liquid-crystal panel onto the recording medium;
    a light-receiving means for receiving the optical beam reflected from the recording medium and for producing an output signal representing the received beam; and
    a reproducing means for reproducing information from the output signal from the light-receiving means.

* * * * *